(12) United States Patent
Young et al.

(10) Patent No.: US 7,783,399 B1
(45) Date of Patent: Aug. 24, 2010

(54) TURN SIGNAL APPARATUS WITH MAGNETIC SENSOR OR COMPASS AND AUTO-CANCEL

(76) Inventors: Esli Kevin Young, 23111 N. Paseo Verde Ln., Peoria, AZ (US) 85383; Eric D. Ronning, 7203 W. Villa Theresa Dr., Glendale, AZ (US) 85308

( * ) Notice: Subject to any disclaimer, the term of this patent is extended or adjusted under 35 U.S.C. 154(b) by 1046 days.

(21) Appl. No.: 11/016,069

(22) Filed: Dec. 17, 2004

(51) Int. Cl.
 *G06F 19/00* (2006.01)
(52) U.S. Cl. .................. 701/36; 340/475; 340/476
(58) Field of Classification Search .......... 340/465, 340/475, 476; 701/36; 116/18, 30, 35
See application file for complete search history.

(56) References Cited

U.S. PATENT DOCUMENTS

| 4,213,116 A * | 7/1980 | Holtzman et al. ........... 340/476 |
| 4,403,211 A | 9/1983 | Shibata et al. |
| 4,638,290 A | 1/1987 | Wagner |
| 4,792,785 A | 12/1988 | Yukio et al. |
| 5,260,685 A | 11/1993 | Parker |
| 6,483,430 B2 | 11/2002 | Okuda et al. |
| 6,677,856 B2 | 1/2004 | Perlman et al. |
| 6,972,675 B2 * | 12/2005 | Mills et al. .................. 340/476 |
| 6,975,218 B2 * | 12/2005 | Madau ....................... 340/476 |
| 2002/0024434 A1 | 2/2002 | Okuda et al. |
| 2003/0191568 A1* | 10/2003 | Breed .......................... 701/36 |
| 2004/0113766 A1 | 6/2004 | Perlman |
| 2005/0131603 A1* | 6/2005 | Liu et al. ...................... 701/36 |

* cited by examiner

*Primary Examiner*—Khoi Tran
(74) *Attorney, Agent, or Firm*—Parsons & Goltry; Michael W. Goltry; Robert A. Parsons

(57) ABSTRACT

A turn signal apparatus includes a heading indicator which provides a heading signal and a control circuit which provides a turn direction output signal. The turn direction output signal is chosen to indicate a turn direction in response to the heading signal and a corresponding turn direction input signal. The turn direction can be for a right turn, a left turn, or a neutral turn. A left or right turn indication can be changed to a neutral turn indication in response to the heading signal.

5 Claims, 15 Drawing Sheets

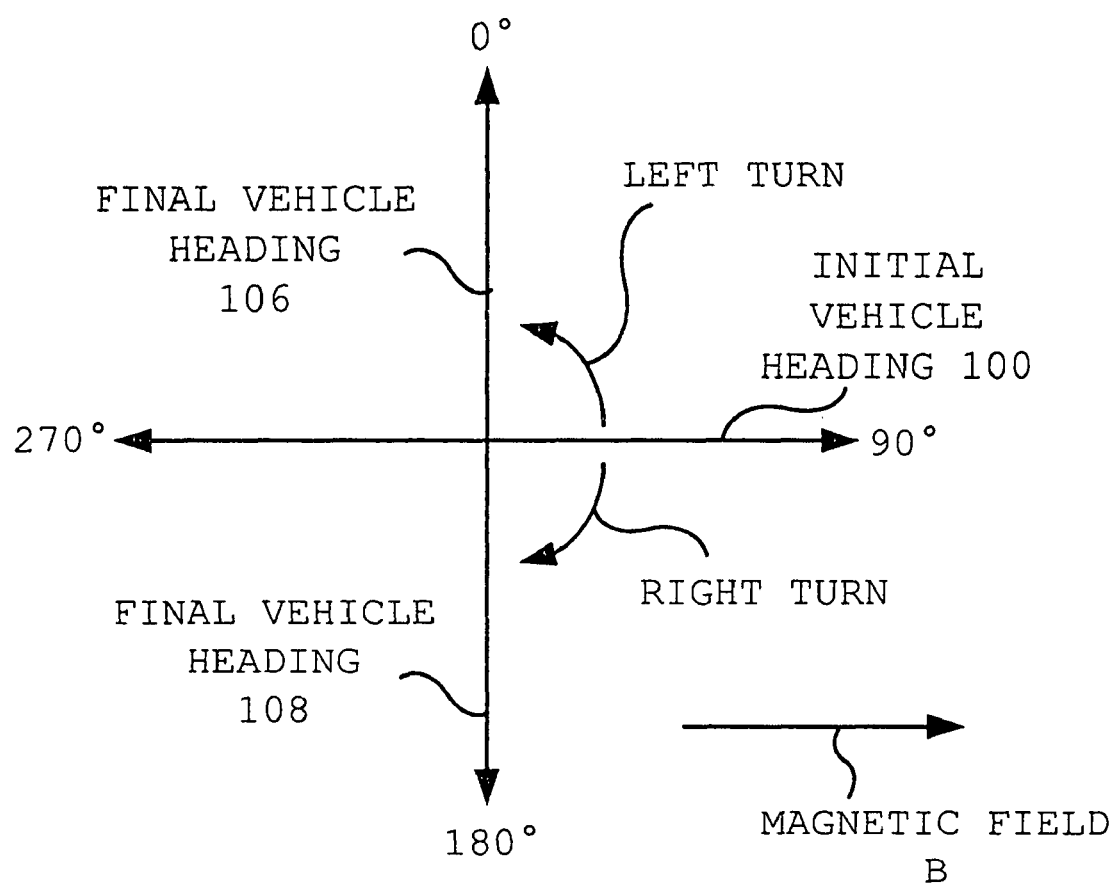

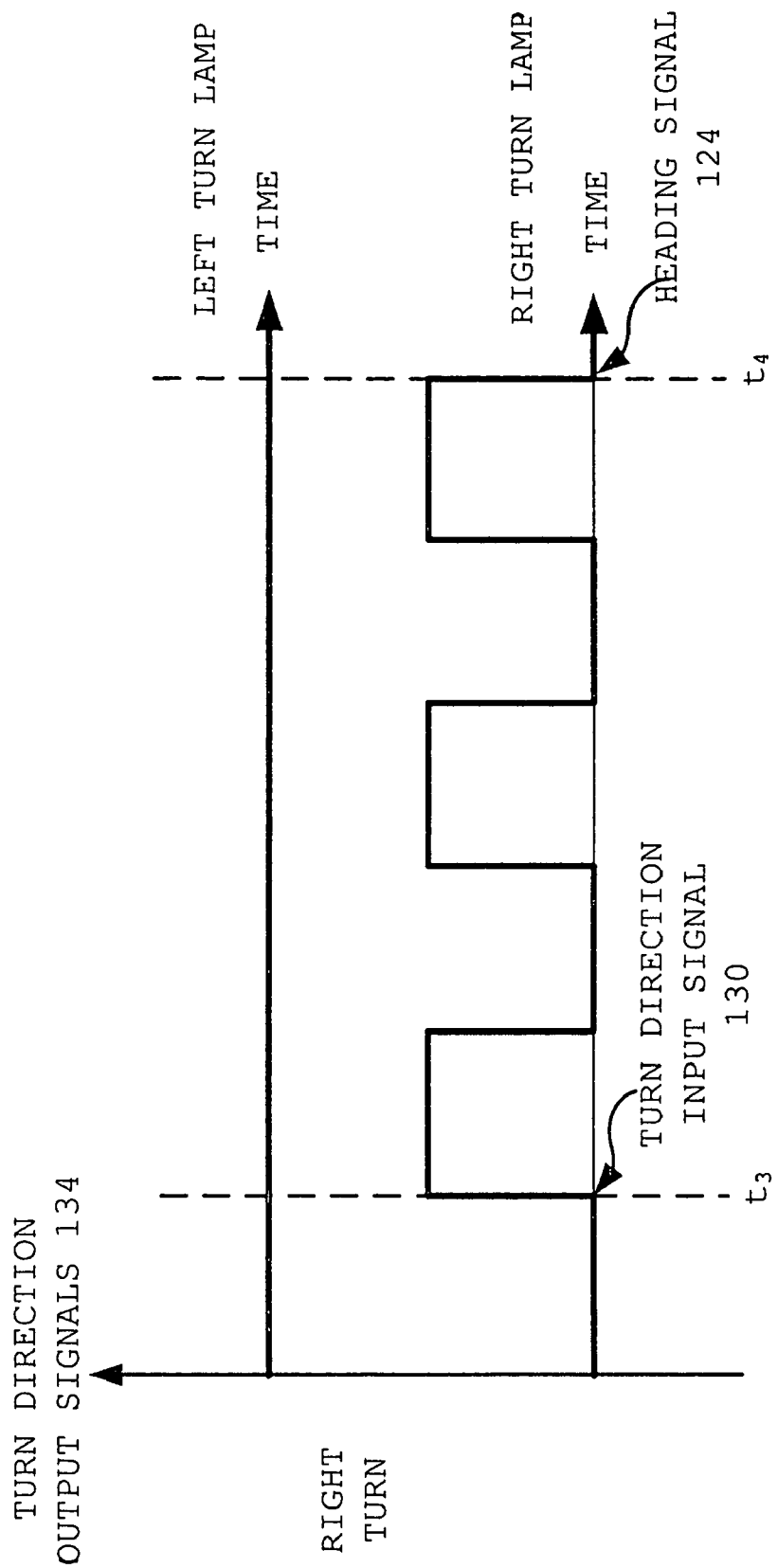

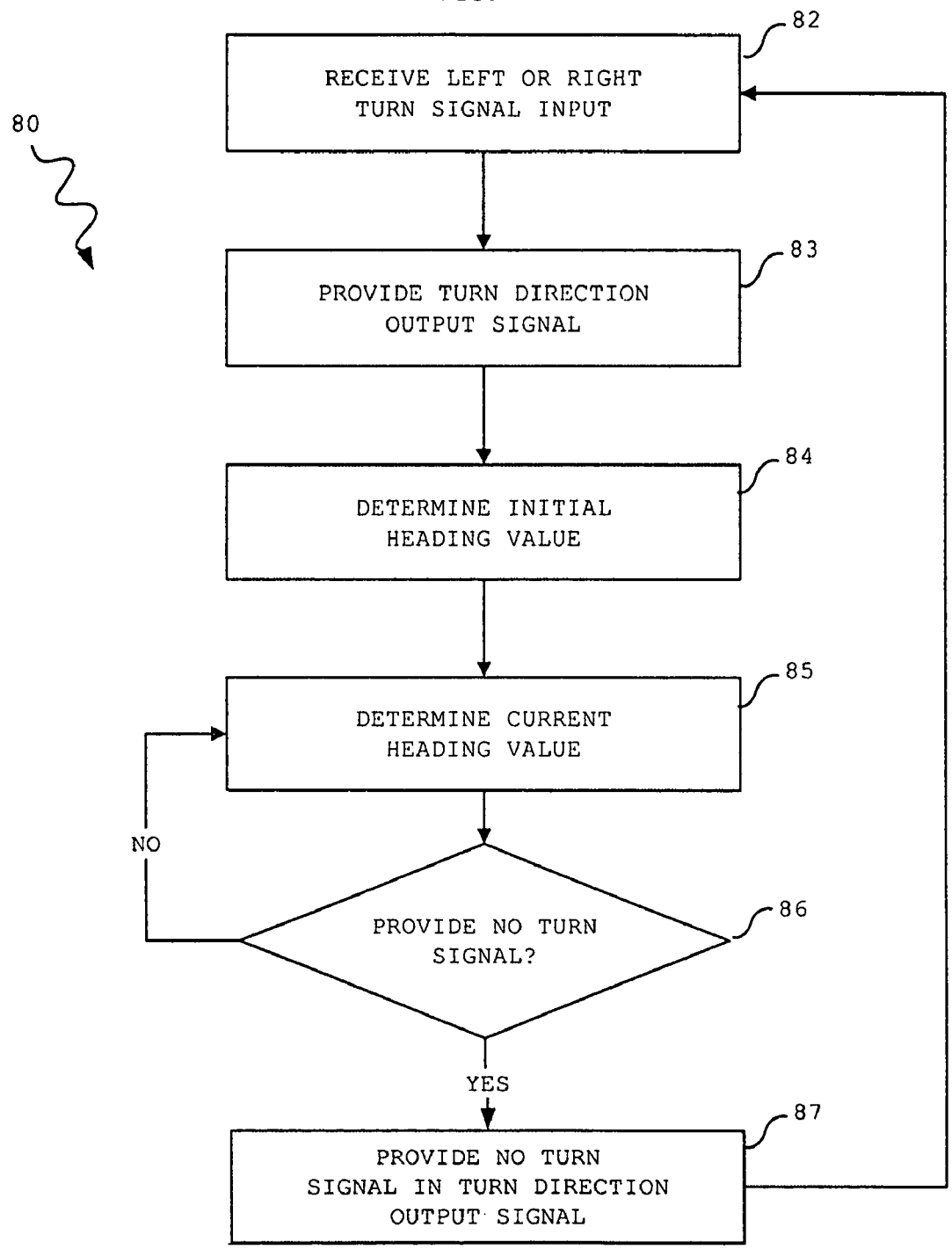

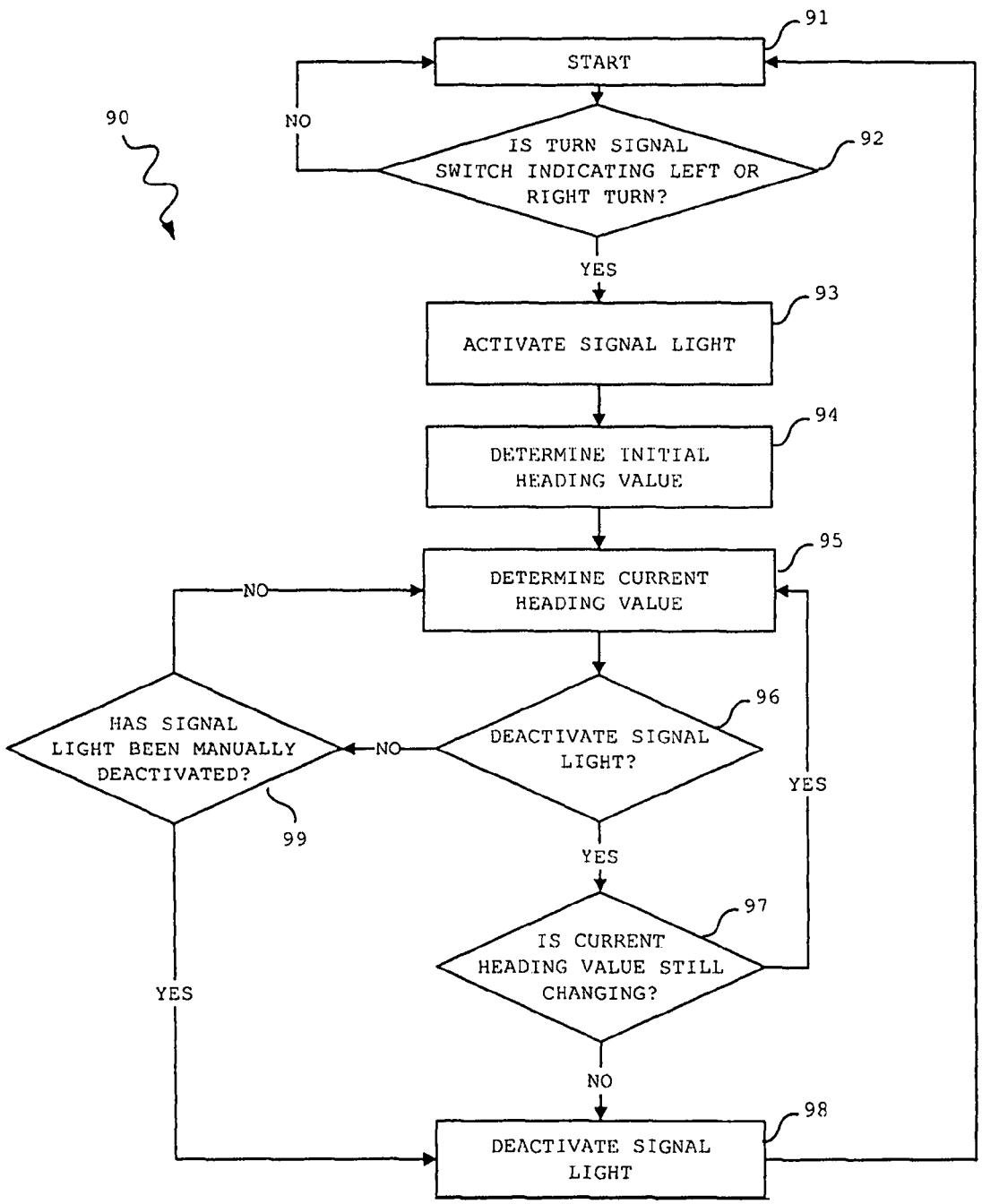

TURN SIGNAL APPARATUS WITH MAGNETIC SENSOR OR COMPASS AND AUTO-CANCEL

BACKGROUND OF THE INVENTION

1. Field of the Invention

This invention relates to vehicles and, more particularly, to vehicle turn signals.

2. Related Art and Prior Art Statement

Vehicles generally include turn signals for safety reasons to indicate the direction of a turn to other drivers. Typical turn signals are controlled by mechanical turn cancellation systems which can include levers, switches, springs, and pawls. Some of these mechanical systems are designed to automatically cancel the turn signal in response to an indication that the vehicle has completed its turn. In some applications, the cancellation of the turn signal can be made by using mechanical means, such as timers, vehicle speed indicators, or angular speed sensors (gyroscope). For motorcycles or scooters, the cancellation of the turn signal can be made by measuring the tilt of the vehicle. These methods have been satisfactory to some extent, but do not function with a high degree of success.

For example, vehicles which use an angular speed sensor to detect changes in the direction of the vehicle to cancel the turn signal are limited because the sensor generally needs to be spinning to function accurately. Mechanical systems also are complicated and difficult to manufacture and assemble, which makes these systems expensive. They are also prone to wearing out which increases the cost if they need to be replaced. Accordingly, there is a need for an economical turn signal apparatus which can accurately and reliably provide and cancel a turn signal.

BRIEF SUMMARY OF THE INVENTION

The present invention includes a turn signal apparatus with a heading indicator and a control circuit. In one embodiment, the heading indicator, consisting of a 2-axis magnetic sensor, provides a heading signal and the control circuit provides a turn direction output signal. The turn direction output signal is chosen in response to the heading signal and a corresponding turn direction input signal. The turn signal apparatus can include a turn direction indicator which provides the turn direction input signal in response to an operator input signal. The turn direction indicator can include an actuator element coupled to a turn signal switch. The turn signal switch provides the turn direction input signal in response to the actuator element. The actuator element is adjustable in response to the operator input signal to indicate a left turn, a right turn, or a neutral turn in the turn direction input signal. In another embodiment, the heading indicator consists of a 3-axis sensor such that the effects of tilting the sensor platform can be accounted for.

The heading indicator can provide an initial heading value in the heading signal which indicates the heading when the actuator element is moved from a neutral turn position to a left or right turn position. The magnetic sensor can also provide a current heading value in the heading signal when the actuator element is in a left or right turn position during the turn.

In one embodiment, the turn signal apparatus can include turn direction indicator lamps which indicate a turn direction in response to the turn direction output signal. The turn signal apparatus can include a memory element which stores an initial heading value from the heading indicator in response to the turn direction input signal changing from indicating a neutral turn to indicating a left or right turn. The control circuit can output the turn direction output signal so it indicates a neutral turn when the initial heading value has changed by a predetermined value. The control circuit can change the turn direction output signal in response to a predetermined change in the heading signal. In some embodiments, the control circuit provides a canceling signal to the turn direction indicator when the heading signal changes by a predetermined value. The turn direction indicator can provide a neutral turn signal in the turn direction input signal in response to the canceling signal.

In addition, this invention provides a turn signal apparatus which includes a heading indicator and a control circuit. The heading indicator provides the heading of a vehicle and the control circuit provides a turn direction output signal in response to a corresponding turn direction input signal. The turn direction output signal is adjusted in response to an indication that the heading of the vehicle has changed by a predetermined value. The control circuit provides the turn direction output signal with a neutral turn signal in response to the indication that an initial heading value of the vehicle has changed by the predetermined value. The control circuit can include a memory element which allows the predetermined value to be programmed and stored. The control circuit can provide a cancel signal in response to the indication that the change in the heading of the vehicle is greater than the predetermined value. The control circuit can also provide the cancel signal after waiting for an indication that the vehicle has completed its turn. The heading indicator provides an initial heading value in response to an indication that the vehicle is starting to turn.

The present invention also provides a turn direction indicator system which includes a turn signal indicator, a heading indicator, and a control circuit. The turn signal indicator provides a turn direction input signal in response to an operator input signal. The heading indicator provides a heading signal corresponding to the heading of a vehicle. The control circuit provides a turn direction output signal in response to the turn direction input signal so that it is adjusted in response to the heading signal. In one embodiment, the turn signal indicator includes an actuator element so that the turn direction input signal can be provided in response to the position of the actuator element. The actuator element is adjustable so that the turn direction input signal indicates a left turn, a right turn, or a neutral turn. The actuator element can be moved from the left or right turn position to the neutral turn position in response to an indication that the vehicle is through turning. The control circuit provides a neutral turn signal in the turn direction output signal in response to the indication that the vehicle is through turning. The heading signal provides an initial heading value which indicates the heading of the vehicle when the actuator element is moved from the neutral turn position to the left or right turn position.

In one embodiment, the heading indicator and control circuit are included in a common housing. In another embodiment, the system includes a memory element which can store an initial heading value from the heading indicator in response to an indication that the vehicle is starting its turn. The turn direction output signal is switched from indicating a left or right turn to indicating a neutral turn when the initial heading value has changed by a predetermined value. In addition, the turn signal system can be included in a vehicle with turn signal indicator lamps which receive the turn direction output signals. The turn signal indicator lamps can indicate the turn direction of the vehicle in response to the turn direction output signals.

These and other features, aspects, and advantages of the present invention will become better understood with reference to the following drawings, description, and claims.

BRIEF DESCRIPTION OF THE DRAWINGS

Referring to the drawings:

FIGS. 2a and 2b are simplified graphs showing headings used by the turn signal apparatus of FIG. 1 to indicate a neutral turn, a left turn, or a right turn;

FIGS. 3c-3f are simplified graphs showing examples of the turn direction output signals as a function of time;

FIG. 7 is a simplified flow chart of a method, in accordance with the present invention, of indicating the turn direction of a vehicle; and FIG. 8 is a simplified flow chart of another method, in accordance with the present invention, of indicating the turn direction of a vehicle.

DETAILED DESCRIPTION OF THE INVENTION

Figure 1:
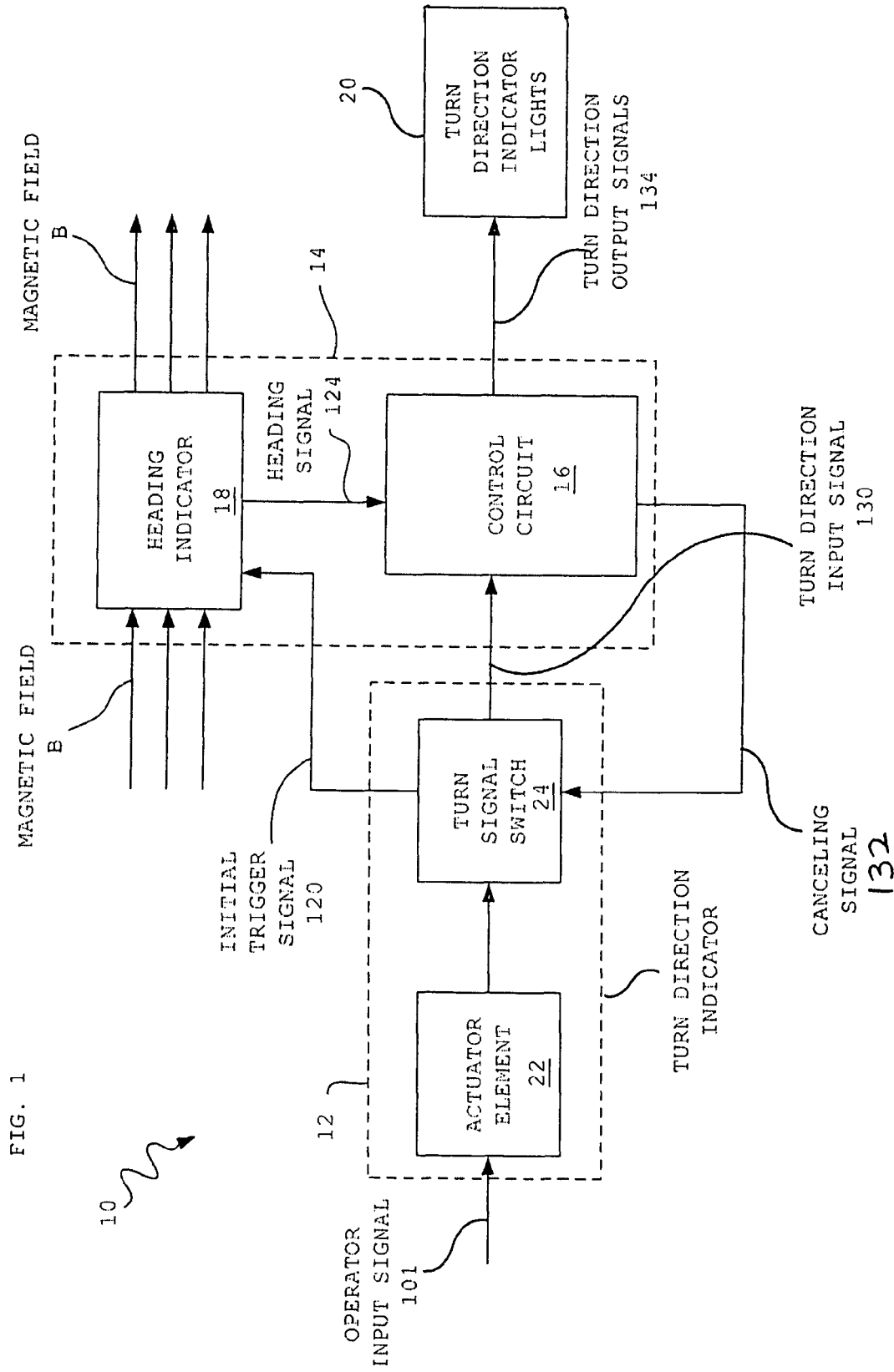
FIG. 1 is a simplified block diagram of a turn signal apparatus in accordance with the present invention.

Turning now to the drawings, in which like reference characters indicate corresponding elements throughout the several views, attention is first directed to FIG. 1 in which there is seen a simplified block diagram of a turn signal apparatus 10 in accordance with the present invention. Apparatus 10 can be included in a vehicle to allow the cancellation of a right or left turn signal indication in response to a heading indication provided by a heading indicator. The heading indication generally corresponds to the heading of the vehicle which changes as the vehicle turns. Typically, the heading indicator provides a current heading signal corresponding to a direction referenced to the front of the vehicle. In other examples, however, the heading can correspond to another reference direction which is at an angle relative to the front of the vehicle. The current heading signal is the present orientation of the vehicle with respect to an external magnetic field, which is typically the Earth's magnetic field.

The vehicle can include an automobile, a motorcycle, a scooter, or another mode of transportation which can use turn direction indicator lights or other devices to indicate a turn direction in response to the right or left turn signals. The various components included in apparatus 10 can be provided in a module so they can be readily integrated into different types of vehicles. These vehicles can include new vehicle designs as well as those already designed with a mechanical turn cancellation system. If the vehicle is already designed with a mechanical turn cancellation system, then it can be replaced with apparatus 10 if desired. Other vehicles include those designed without turn direction indicator lights. Examples of vehicles designed without turn direction indicator lights include older automobiles, race cars, or kit cars, which are typically not "street legal" without turn indicator lights.

In accordance with the invention, an operator can provide a left or right turn indication when the turn is started to activate corresponding turn indicator lights. The right or left turn signal indication can be cancelled or deactivated when the heading indicator determines that the heading of the vehicle has changed by a predetermined value during the turn. In one embodiment, when the heading has changed by this predetermined value, the turn has been completed and the right or left turn signal indication is changed to a neutral turn indication. The predetermined value can correspond to an angle, such as 90°, which is approximately the heading change in most turns. It should be noted, however, that the predetermined value can be other angles greater than or less than 90°, such as 80° or 100°, which can be programmed in or provided to apparatus 10.

In one embodiment, apparatus 10 includes a controller 14 with a heading indicator 18 and a control circuit 16. However, it should be noted that controller 14 can include other circuitry such as memory elements. The memory elements can be included within control circuit 16 or they can be external to it. Controller 14 can include a common housing to house heading indicator 18, control circuit 16, and any other circuitry as a single module so apparatus 10 can be readily integrated into a vehicle. Control circuit 16 includes logic and/or timing circuitry to provide turn direction output signals 134 in response to turn direction input signals 130. It should be noted that turn direction input signal 130 and turn direction output signal 134 typically each include one or more signals, but the respective signals are not shown individually in FIG. 1 for simplicity.

Heading indicator 18 can include a magnetic sensor or a compass which provides a heading signal 124 in response to an external magnetic field B, which, in this example, corresponds to the Earth's magnetic field. In one example, heading indicator 18 includes a magnetic sensor which senses magnetic field B and provides heading signal 124 in response to the orientation of a magnetization vector relative to an easy axis of the sensor. The easy axis is the axis that the magnetization vector aligns itself with when magnetic field B is zero or below a certain value. In other words, the easy axis is the preferred direction of the magnetization vector when the magnitude of magnetic field B is too small to cause the magnetization vector to rotate.

An example of a particular magnetic sensor which can be used in apparatus 10 is provided by Honeywell, which manufactures 1-axis, 2-axis and 3-axis magnetic sensors. The part numbers for one type of 1-axis sensors is HMC1001 and HMC1121 and the part numbers for one type of 2-axis sensors is HMC1002 and HMC1122 and the part numbers for one type of 3-axis sensor is HMC1053. Another example of a 1-axis magnetic sensor includes the KMZ series of magnetic sensors made by Phillips Semiconductors. It should be noted that multiple axis systems can be built up by the use of single and double axis sensors so that magnetic field B can be detected with greater accuracy. For example, a 3-axis system could be constructed from three 1-axis sensors, one 1-axis sensor and 2-axis sensor, or two 2-axis sensors. These are just a few types of magnetic sensors which can be used in apparatus 10. Accordingly, it should be noted that there are many other different types of magnetic sensors which could also be used.

The Honeywell magnetic sensor includes a four-element Wheatstone bridge so that it converts magnetic field B to a differential output voltage which depends on the direction of magnetic field B relative to the easy axis. In this way, the magnetic sensor operates similar to a compass which provides an output voltage that corresponds to a heading indicated by the compass. These magnetic sensors are made of nickel-iron thin films deposited on a silicon wafer and are patterned as a resistive strip. In the presence of magnetic field B, a change in the resistance of the Wheatstone bridge causes a corresponding change in the output voltage. During manufacture, the easy axis of the nickel-iron thin film is set to one direction along the length of the film. This controls the change in resistance for an applied magnetic field within the thin film. The easy axis can also be set in other directions after manufacture by providing positive and negative Set/Reset signals, as discussed in more detail below in conjunction with FIG. 6a.

In operation, magnetic field B is applied to the surface of the film. This causes the magnetization vector of the sensor to rotate and change its angle to align itself with magnetic field B. This in turn causes the resistance value of the Wheatstone bridge to vary and produce a corresponding output voltage change. The change in the resistance of the nickel-iron thin films is caused by the magnetoresistive effect. This change in resistance causes the current flow through the Wheatstone bridge to change with the angle of the magnetization vector relative to the easy axis. Hence, the angle of the magnetization vector relative to the easy axis depends on the direction of magnetic field B relative to the easy axis.

In accordance with the invention, control circuit 16 provides turn direction output signals 134 which is chosen in response to heading signal 124 and corresponding turn direction input signal 130. Since turn direction output signal 134 depends on heading signal 124, it also depends on the orientation of the easy axis relative to magnetic field B. Accordingly, changes in the orientation of the easy axis during the turn can be used to change turn direction output signal 134.

Turn direction output signals 134 can be provided to turn direction indicator lights 20 to activate and/or deactivate them to indicate the turn direction. Turn direction indicator lights 20 can include light emitters, such as light bulbs or light emitting diodes, which can be activated and/or deactivated to indicate the turn direction to an observer. Turn direction indicator lights 20 typically include left and right front and rear indicator lights. However, in some embodiments, they can be positioned at only one end of the vehicle, such as the rear.

When one of the lights is deactivated, it means that it does not indicate a turn. When one of the lights is activated, it means that it is provided with a signal so that it indicates the direction of the turn of the vehicle. The light can be activated so that it is on continuously or it turns on and off so that it "blinks". Hence, in response to a left turn signal received by control circuit 16, control circuit 16 activates the front left and/or rear left lights. Similarly, in response to a right turn signal 114 received by control circuit 16, control circuit 16 activates the front right and/or rear right lights.

In this embodiment, a turn direction indicator 12 provides turn direction input signal 130 in response to an operator input signal 101. Turn direction indicator 12 can also provide an initial trigger signal 120 to heading indicator 18 in response to an indication that the operator wants to turn the vehicle. Turn direction indicator 12 includes an actuator element 22 coupled to a turn signal switch 24. Turn signal switch 24 provides turn direction input signal 130 in response to the position of actuator element 22 and initial trigger signal 120 when actuator element 22 is moved by the operator to indicate a turn.

Actuator element 22 is adjustable by the operator who provides operator input signal 101 to indicate a left turn, a right turn, or a neutral turn in turn direction input signal 130. For example, actuator element 22 can include a lever. Here, operator input signal 101 is provided by the operator when actuator element 22 is moved up to indicate a right turn or moved down the indicate a left turn. Actuator element 22 is typically in a middle or neutral position to indicate no turn. Hence, in response to operator input signal 101, turn direction indicator 12 provides turn direction input signal 130 to indicate the left turn, right turn, or no turn. It should be noted that turn direction indicator 12 can include another device in place of a lever which can be adjusted by the operator to indicate the turn direction. For example, it can include buttons that can be pushed by the operator to indicate the turn direction. Typical automobiles include a lever with three positions—a neutral position, a left turn position, and a right turn position.

In accordance with the invention, if operator input signal 101 is indicating a left or right turn, then it can be switched to indicate a neutral turn in response to heading signal 124 as discussed in more detail below. In this example, heading indicator 18 receives initial trigger signal 120 from turn signal switch 24 when actuator element 22 is moved from a neutral turn position to a left or right turn position. Accordingly, output signal 134 will also be switched to indicate a neutral turn.

There are several ways in which heading signal 124 and input signal 130 can be used to change output signal 134. In one way, control circuit 16 can provide a canceling signal 132 to turn signal switch 24 and, in response, switch 24 can move actuator element 22 to its neutral or no turn position. Canceling signal 132 can be provided if heading signal 124 has changed by a predetermined amount. In this way, input signal 130 is switched, to indicate a neutral turn after the turn is made.

In another way, an initial heading from the magnetic sensor can be stored in a memory element (not shown) in response to an indication that input signal 130 has been switched from indicating a neutral turn to indicating a left or right turn. Controller 14 can then provide a trigger signal to heading indicator 18 to read the current heading provided by the magnetic sensor as the vehicle turns. Controller 14 can compare the difference between the current heading and the initial heading to the predetermined value. When this difference is greater than or equal to the predetermined value, controller 14 can provide canceling signal 132 as described above to cancel left turn signal 112 or right turn signal 114 so that turn direction input signal 130 indicates a neutral turn. As a result of this, control circuit 16 changes turn direction output signal 134 so it corresponds to turn direction input signal 130.

It should be noted that controller 14 can include analog and/or digital circuitry to provide its desired operation. The digital circuitry can include logic gates, such as AND, OR gates, and/or buffers, and the analog circuitry can include operational amplifiers which operate as adders, subtractors, and/or comparators. Controller 14 can also include a memory element to store heading signals from heading indicator 18.

Controller 14 can include integrated circuit(s) or it can include discrete components or combinations thereof. The various components included in controller 14 can be provided on the same substrate or they can be coupled together using interconnects, such as printed wiring boards, wire bonds or soldered wires. The detailed configuration of this circuitry will be readily apparent to one skilled in the art since the design often depends on knowing the behavior of the input and output signals which is described in detail herein.

Figure 2B:
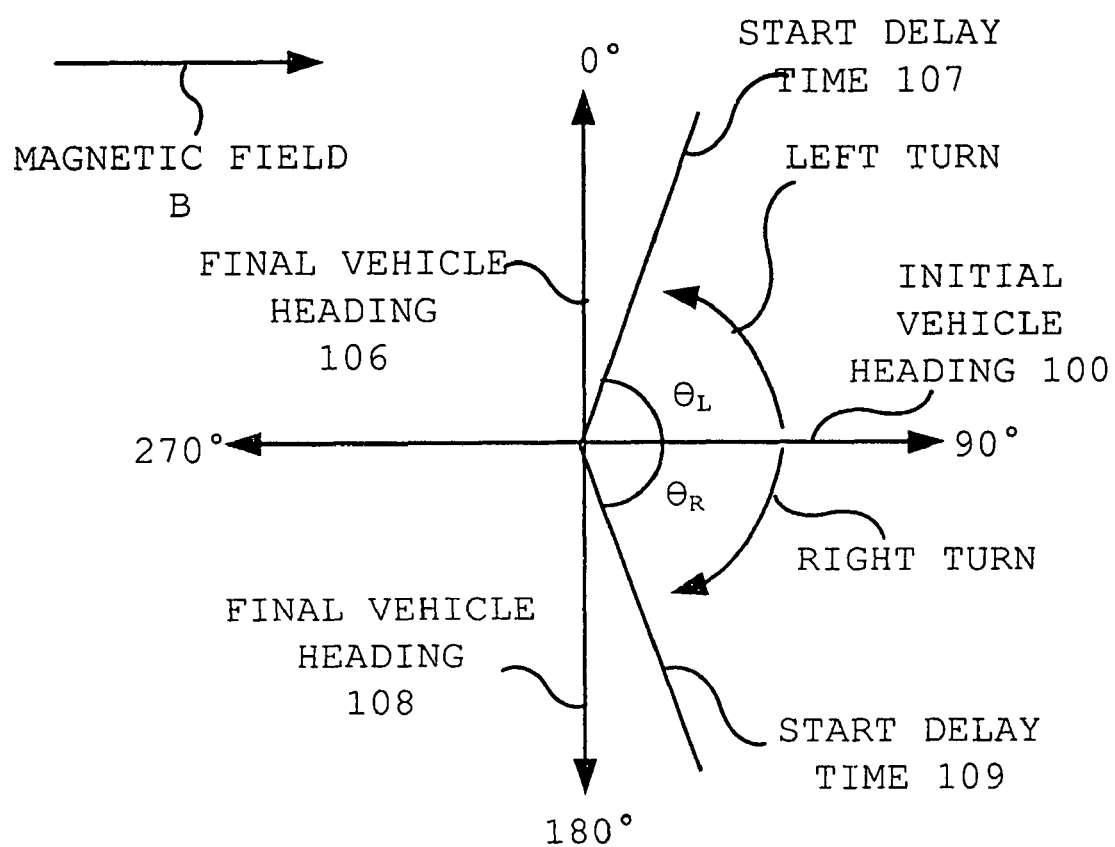

FIGS. 2a and 2b are simplified graphs showing more details about how the turn signal can be canceled in response to the heading of the vehicle. The graphs show reference heading directions corresponding to 0°, 90°, 180°, and 270°. For this illustration, the initial heading of the vehicle is shown to be 90° and magnetic field B is shown oriented at 90° for illustrative purposes. However, it should be noted that magnetic field B can be oriented in other directions.

In FIG. 2a, the left and right turns are complete when the current headings are 0° and 180°, respectively. Hence, the predetermined value when the vehicle completes its turn is 90° in this example. For the left turn, the cancel signal is activated by control circuit 16 when the current heading is 0° so that turn direction indicator 12 is switched from indicating a left turn to indicating a neutral turn as described above. Similarly, for a right turn the cancel signal is activated by control circuit 16 when the current heading is 180° so that turn indicator 12 is switched from indicating a right turn to indicating a neutral turn. In this way, turn direction output signal 134 can be cancelled in response to a change in the heading of the vehicle. It should be noted that, in some embodiments, the right or left turn output signal can be cancelled after the turn is through. This cancellation can occur in response to an indication that the vehicle's current heading is approximately constant indicating that the vehicle is heading substantially straight.

In FIG. 2b, the left and right turns are complete when the current headings are 0° and 180°, respectively. However, in this example, the predetermined value when the vehicle completes its turn is $\theta_L$ and $\theta_R$ for left and right turns, respectively, where $\theta_L$ and $\theta_R$ are less than 90°. For the left turn, a neutral turn indication is provided when the current heading is at an angle of $\theta_L$ from an initial vehicle heading 100. However, the cancel signal is delayed for a period of time 107 so that it is activated by control circuit 16 when it is estimated that the vehicle has turned 90° to the left and the current heading is 0°. For a left turn, delay time 107 starts when the heading of the vehicle has changed by $\theta_L$ and ends when the heading of the vehicle is 0°. After delay time 107, turn direction indicator 12 is switched from indicating a left turn to indicating a neutral turn as described above.

Similarly, for the right turn, a neutral turn indication is provided when the predetermined value is $\theta_R$ from initial vehicle heading 100. However, the cancel signal is delayed for a period of time 109 so that it is activated by control circuit 16 when it is estimated that the vehicle has turned 90° to the right and the current heading is 180°. For a right turn, delay time 109 starts when the heading of the vehicle has changed by $\theta_R$ and ends when the heading of the vehicle is 180°. After delay time 109, turn direction indicator 12 is switched from indicating a right turn to indicating a neutral turn as described above. In this way, turn direction output signal 134 can be cancelled after a time delay in response to the change in heading of the vehicle.

Figure 3A:
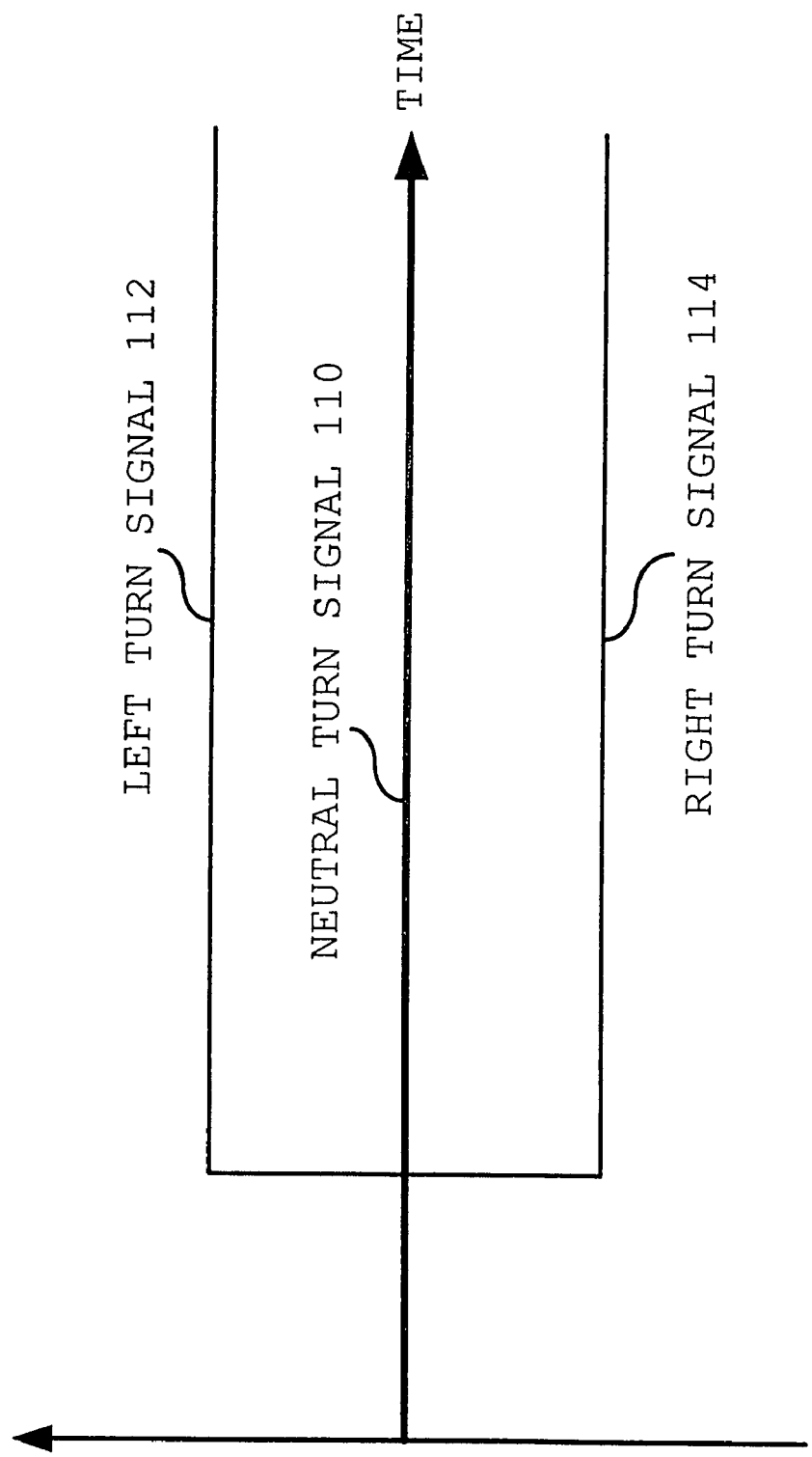
FIGS. 3a and 3b are simplified graphs showing examples of the turn direction input signals as a function of time.
Figure 3B:
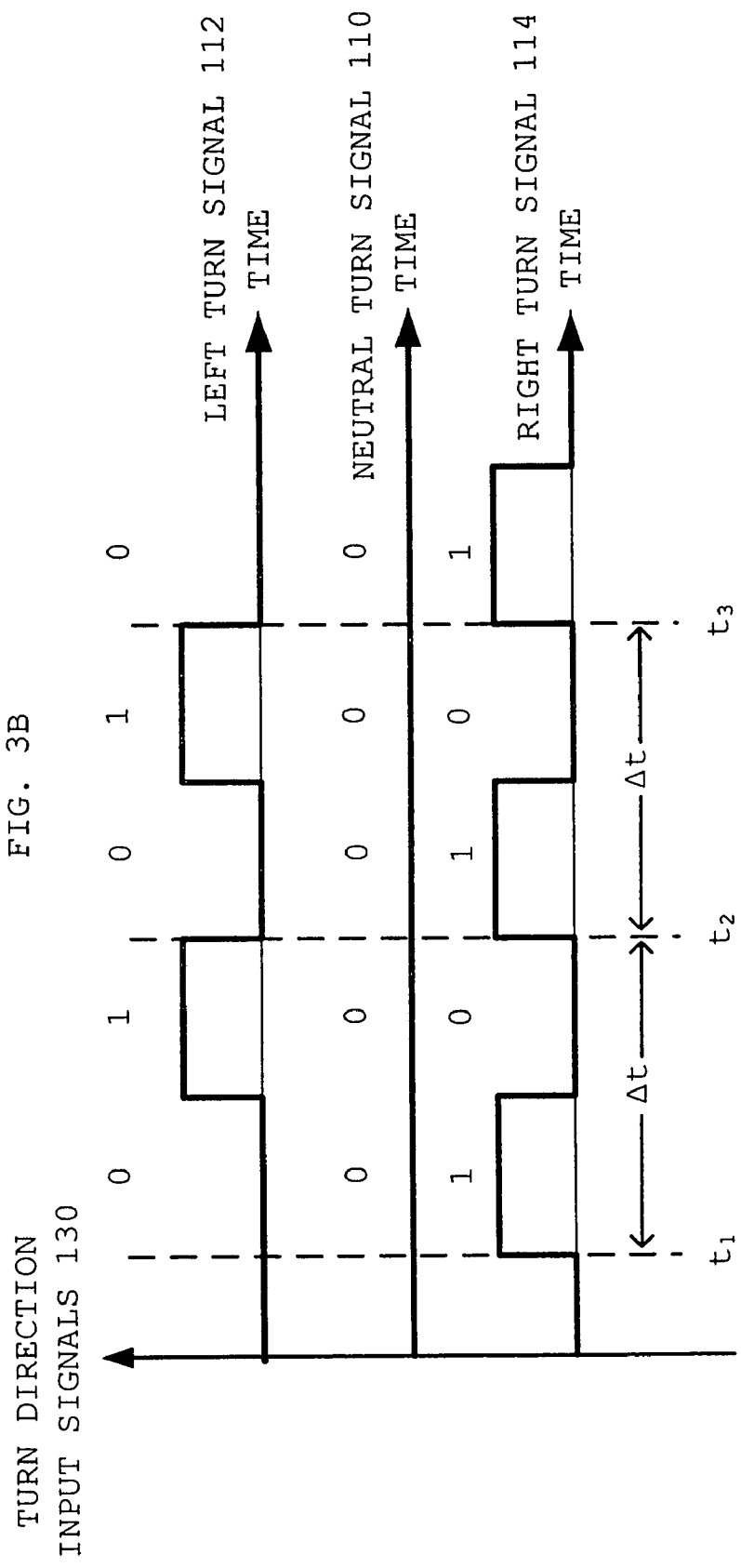

FIGS. 3a and 3b are simplified graphs showing examples of turn direction input signal 130 as a function of time and FIGS. 3c-3f are simplified graphs showing examples of turn direction output signals 134 as a function of time. In FIG. 3a, left turn signal 112 and right turn signal 114 are shown as positive and negative signals, respectively, and neutral turn signal 110 is shown as a zero signal. It should be noted that turn direction input signals 130 can have other shapes and/or polarities, but are shown as positive, negative, and zero signals in FIG. 3a for simplicity and ease of discussion. Further, it is to be understood that input signals 130 can be left or neutral or right.

For example, turn direction input signals 130 could include digital signals, as shown in FIG. 3b, which are coded to indicate the turn direction. In one example, neutral turn signal 110 can be a digital zero (00) to indicate a neutral turn, left turn signal 112 can be a digital one (01) to indicate a left turn, and right turn signal 114 can be a digital two (10) to indicate a right turn. The codes can be provided in clock cycles. For example, one clock cycle can be defined as the time difference $\Delta t$ between times $t_1$ and $t_2$ in which the two bits in the code can be read.

Figure 3C:
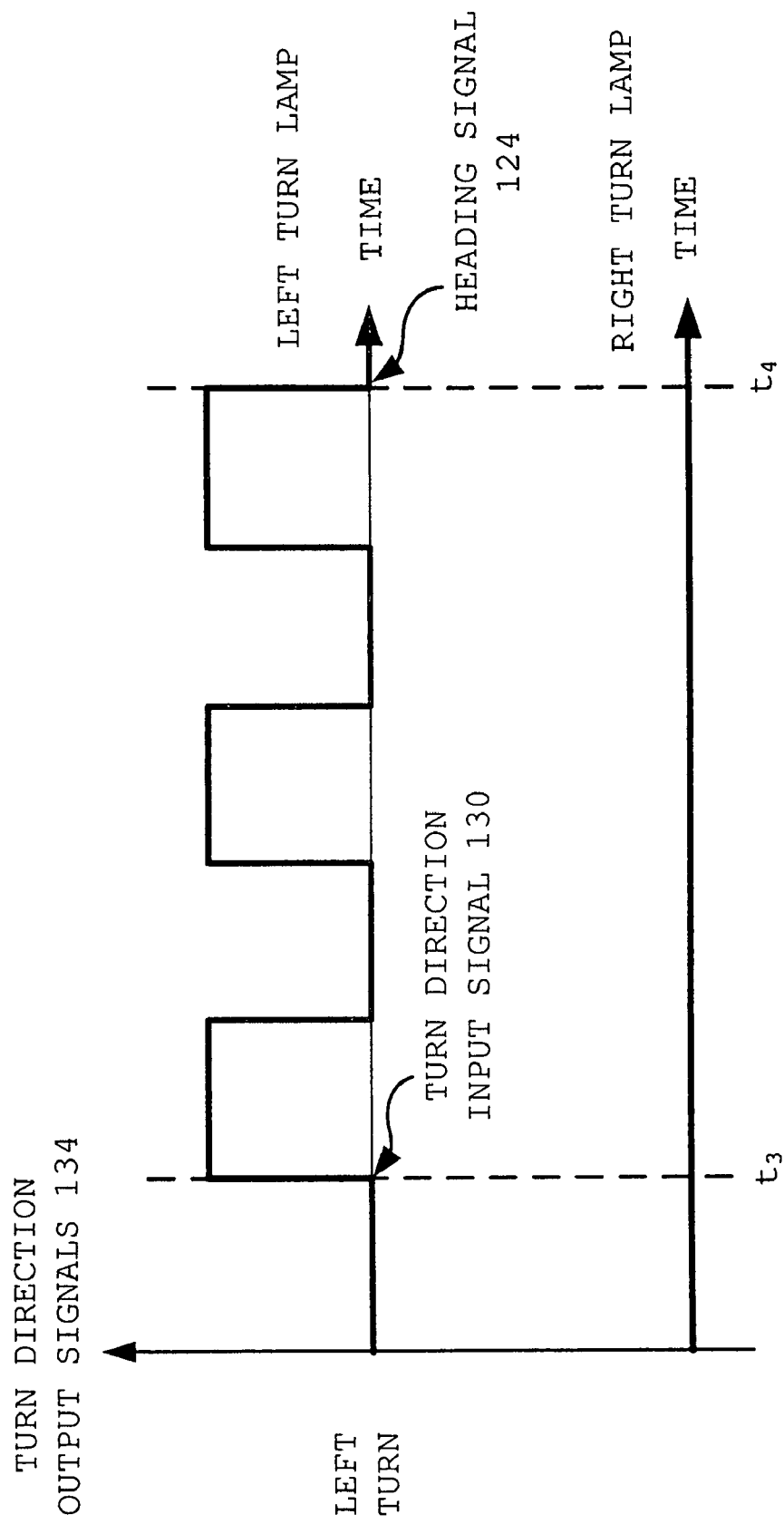
Figure 3D:
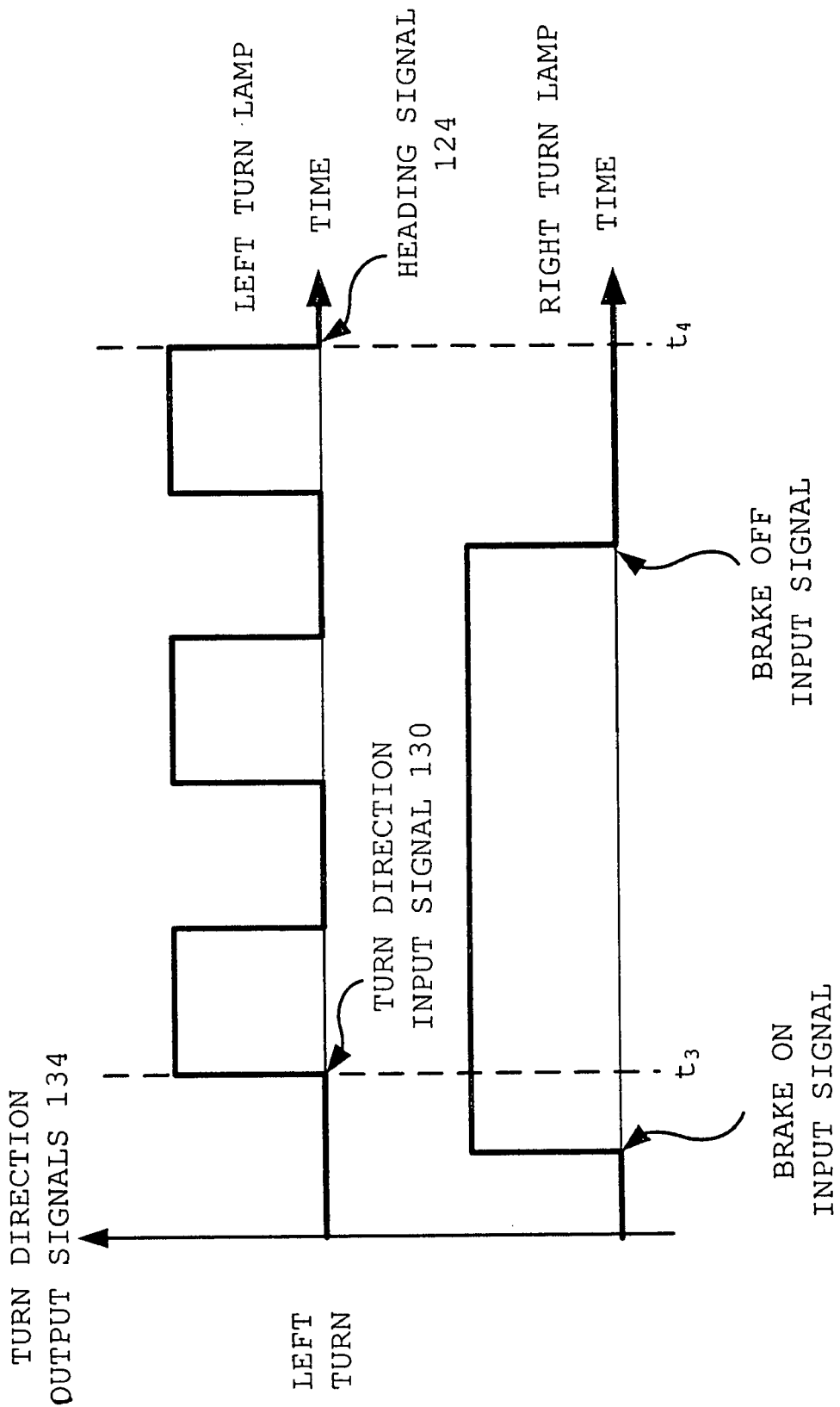

In FIGS. 3c-3f, it is assumed that there are two turn direction indicator lamps, one for indicating a left turn and the other for indicating a right turn. Accordingly, when a left turn is desired as in FIGS. 3c and 3d, the left turn lamp signal is activated at a time $t_3$ in response to turn direction input signal 130 so that it turns on and off to indicate the left turn. In FIG. 3c, the right turn lamp signal is deactivated so that it does not emit light. However, in FIG. 3d, the right turn light is turned on so that it emits light continuously to indicate braking by the vehicle. In both FIGS. 3c and 3d, the left turn lamp is activated until a time $t_4$ when it is deactivated in response to heading signal 124 indicating that the turn is complete, as discussed above in conjunction with FIG. 1. If the right turn lamp is turned on to indicate braking, then it can be deactivated when a brake off input signal is received.

Figure 3F:
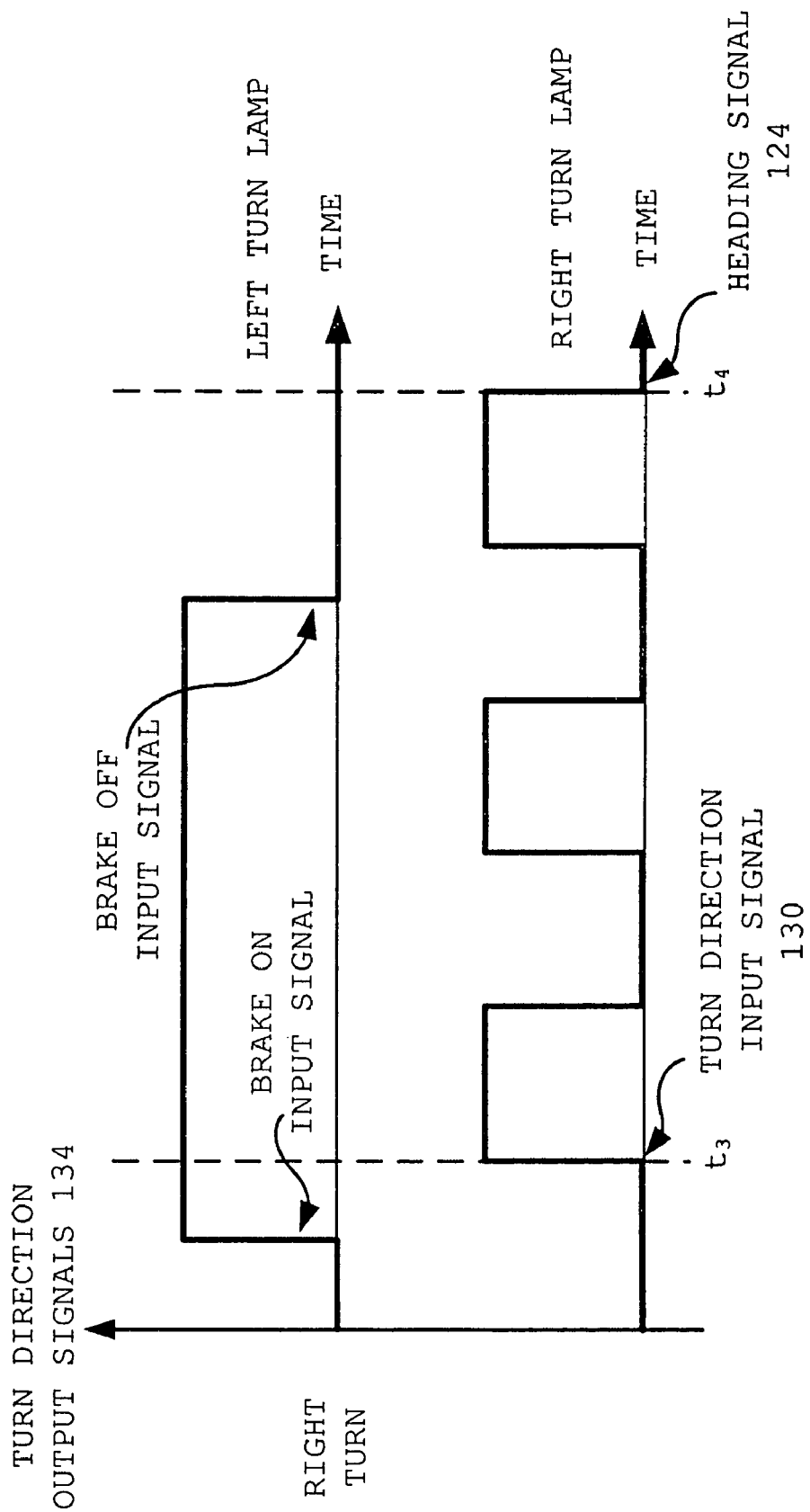

When a right turn is desired as in FIGS. 3e and 3f, the right turn lamp signal is activated at a time $t_3$ in response to turn direction input signal 130 so that it turns on and off to indicate the right turn. In FIG. 3e, the left turn lamp signal is deactivated so that it does not emit light. However, in FIG. 3f, the left turn light is turned on so that it emits light continuously and indicates braking by the vehicle. In both FIGS. 3e and 3f, the right turn lamp is activated until a time $t_4$ when it is deactivated in response to heading signal 124 indicating that the turn is complete, as discussed above in conjunction with FIG. 1. If the left turn lamp is turned on to indicate braking, then it can be deactivated when the brake off input signal is received.

It should be noted that turn direction output signals 134 shown in FIGS. 3c-3f can have other shapes and polarities, but are shown as positive and/or zero signals for simplicity and ease of discussion. For example, turn direction output signals 134 could be positive, negative, and zero signals to activate and deactivate the turn direction indicator lamps, as shown in FIG. 3a. Turn direction output signals 134 could also be digital signals in which a digital zero (00) deactivates either of the lamps and a digital one (01) activates them, as shown in FIG. 3b.

Apparatus 10 and controller 14 can be configured in many different ways to provide substantially the same or a similar operation so that the output signals are activated and deactivated at the desired time in response to heading signal 124 provided by heading indicator 18. The examples discussed herein are meant to be exemplary and the exclusion of other configurations is not meant to limit the scope of the claimed invention. Hence, other configurations will be readily apparent to those skilled in the art, but only a few are shown for simplicity and ease of discussion. With this in mind, other examples of controller 14 are discussed below in conjunction with FIGS. 4 and 5 and other examples of apparatus 10 are discussed in FIGS. 6a and 6b.

Figure 4:
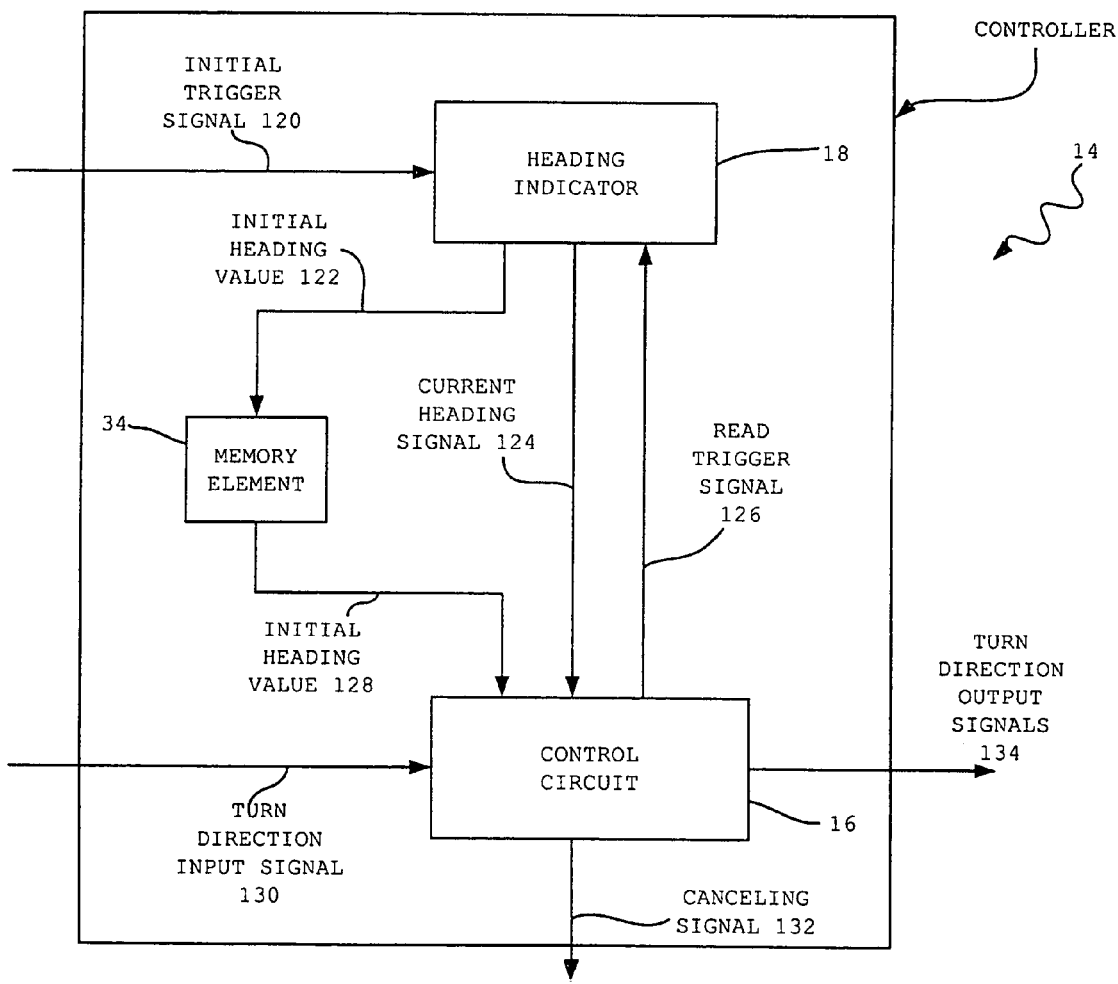
FIG. 4 is a more detailed block diagram of one embodiment of the controller shown in FIG. 1.

FIG. 4 is a more detailed block diagram of one embodiment of controller 14 in accordance with the present invention. In this embodiment, controller 14 includes a memory element 34 which receives an initial heading value 122 from heading indicator 18. Initial heading value 122 is the heading when the turn starts. This happens in response to initial trigger signal 120 being received by heading indicator 18. Memory element 34 stores initial heading value 122 and provides it to control circuit 16. Control circuit 16 provides a read trigger signal 126 to heading indicator 18 which triggers sensor 18 to provide current heading signal 124 to control circuit 16 until there is an indication that the turn is complete.

There are several ways to determine if the turn is complete. The indication that the turn is complete can be provided by having a predetermined value stored in controller 14 or a memory element outside of controller 14. The initial and current heading values 122 and 124 can be compared by control circuit 16 to determine if their difference is greater than or equal to the predetermined value. If this is the case, then this indicates that the turn is complete. For example, the predetermined value can be around 90°, as discussed with FIG. 2*a*, so when the current value provided by the current heading signal to circuit 16 is 90° from initial heading value 122, circuit 16 will determine that the turn is through.

When the turn is through, canceling signal 132 can be provided by circuit 16 to turn signal switch 24. Canceling signal 132 can be provided as soon as there is an indication that the turn is through or there can be a waiting period before canceling signal 132 is sent. In the case where there is a waiting period, the predetermined value can be less than the angle for a typical turn, as discussed with FIG. 2*b*. In this way, apparatus 10 determines that the turn is "completed" short of the actual turn, but the waiting period delays the generation of canceling signal 132 until the actual turn is estimated to be complete.

Figure 5:
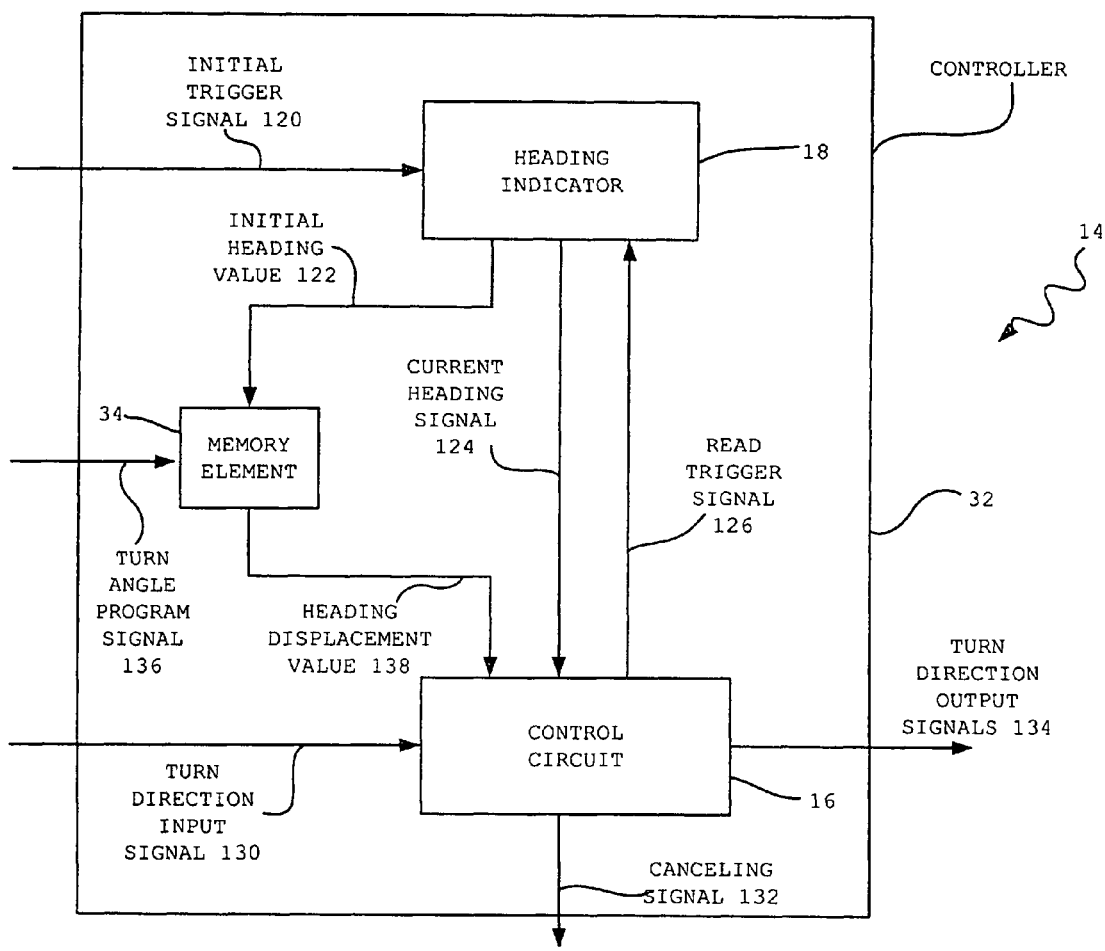
FIG. 5 is a simplified block diagram of another embodiment of the controller shown in FIG. 1.

FIG. 5 is a simplified block diagram of another embodiment of controller 14 in accordance with the present invention. In this example, heading indicator 18 provides initial heading value 122 to memory element 34 and heading signal 124 to control circuit 16. Memory element 34 receives a turn angle program signal 136 which provides the predetermined value. The predetermined value and initial heading value 122 are used to calculate a heading displacement value 138 which is provided to control circuit 16. Turn angle program signal 136 can be used to program the predetermined value into memory element 34 during the manufacture of controller 14 or it can be provided by the end user to customize the operation of controller 14.

Figure 6A:
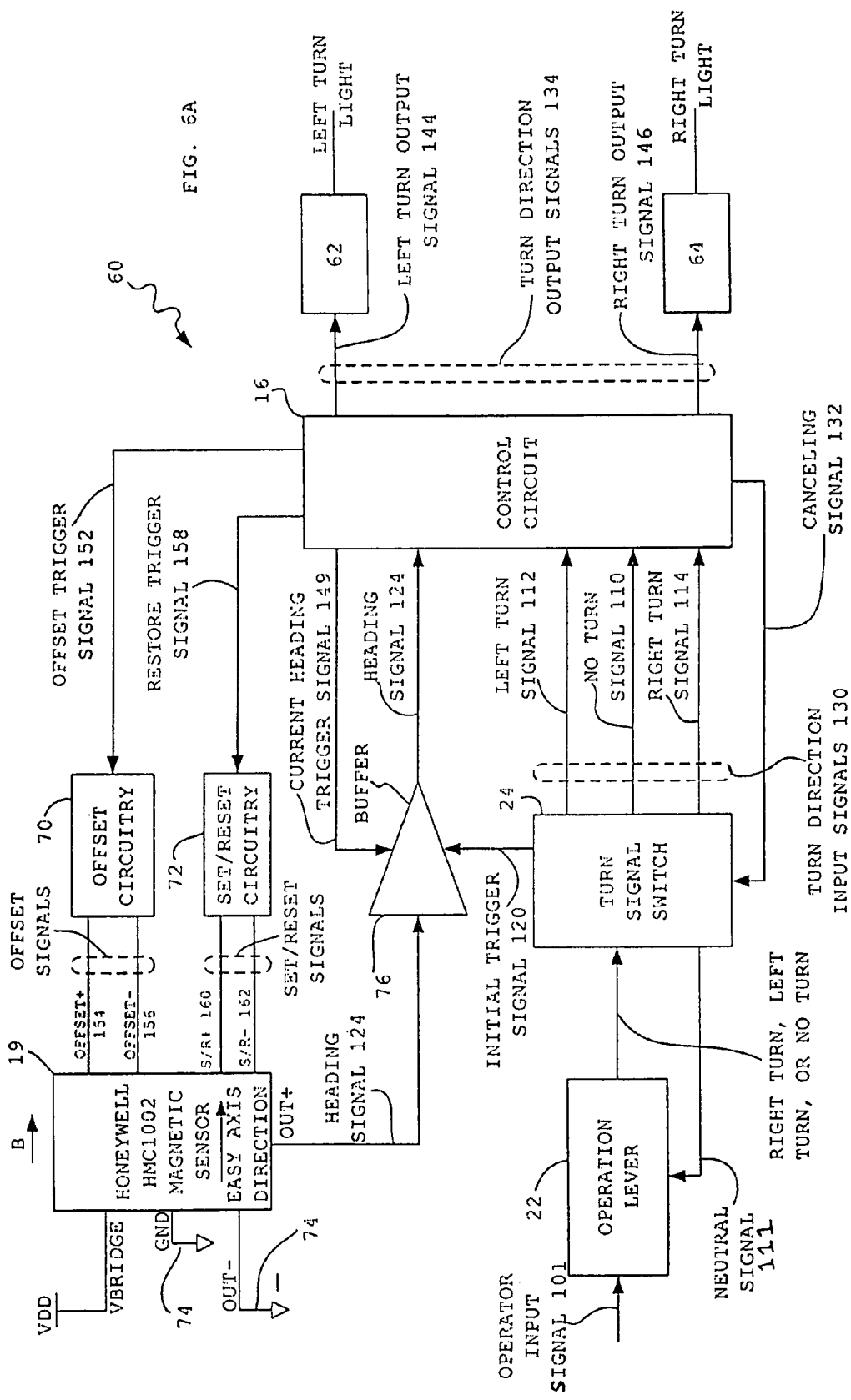
FIGS. 6a and 6b are simplified block diagrams of other embodiments of a turn signal apparatus in accordance with the present invention.

FIG. 6*a* is a simplified block diagram of another embodiment of a turn signal apparatus 60 in accordance with the present invention, which operates in a similar manner to apparatus 10. In this example, operator input signal 101 is provided to operation lever 22. In response to this signal, a right turn, left turn, or no turn indication is provided to turn signal switch 24. As a result, turn signal switch provides a corresponding right turn signal 114, left turn signal 112, or neutral turn signal 110 to control circuit 16. In this embodiment, these signals can be analog or digital signals, as discussed above in FIGS. 3*a* and 3*b*.

Here, turn direction input signals 130 are provided on separate lines to control circuit 16. To indicate a left turn, the left turn line has a high signal and the right turn and neutral turn lines have low signals. Similarly, to indicate a right turn, the left turn and neutral turn lines have low signals and the right turn line has a high signal. To indicate a neutral turn, the neutral turn line has a high signal and the left and right turn lines have low signals. It should be noted, however, that there are other ways to represent the right, left, and neutral turn signals in this embodiment so that apparatus 60 operates in substantially the same manner.

Turn signal switch 24 also provides initial trigger signal 120 in response to an indication from actuator element 22 that operator input signal 101 changes from a neutral turn indication to a left or right turn indication. If actuator element 22 indicates to turn signal switch 24 that its state is changing from a neutral turn to a right or left turn, then switch 24 provides initial trigger signal 120 to an enable of a buffer 76. In response to initial trigger signal 120, buffer 76 provides heading signal 124 with an initial heading value to control circuit 16. It should be noted that buffer 76 can be replaced with other circuitry that can pass through a signal from its input to its output in response to one or more trigger signals and the use of a buffer is for simplicity and ease of discussion.

Buffer 76 receives heading signal 124 from magnetic sensor 19 which, in this embodiment, includes the Honeywell HMC1001 chip. Heading signal 124 is provided by the OUT+ pin of the HMC1001 chip where it is provided to control circuit 16 through buffer 76 and the OUT– pin is coupled to a current return 74. Pin GND of the HMC1001 chip is also coupled to current return 74 and pin Vbridge is coupled to a power supply $V_{DD}$. Current return 74 can be an AC and/or DC ground or another reference potential so that power is supplied to magnetic sensor 19 through signals provided to the Vbridge and GND pins of the HMC1001 chip. It should be noted that magnetic sensor 19 and buffer 76 can be coupled together to operate as heading indicator 18 discussed above. Other magnetic sensors or a compass can be used in place of magnetic sensor 19 and the use of the Honeywell HMC1001 chip in this embodiment is for illustrative purposes only.

In this example, control circuit 16 includes a memory device (not shown) to store the initial heading value. After control circuit 16 receives left turn signal 112 or right turn signal 114 and stores the initial heading value, it activates corresponding left turn light 62 or right turn light 64. In this regard, in response to left turn signal 112, control circuit 16 provides left and right turn output signals 144 and 146 so that left turn light 62 and right turn light 64 are on and off, respectively. Similarly, in response to right turn signal 114, control circuit 16 provides left and right turn output signals 144 and 146 so that left turn light 62 and right turn light 64 are off and on, respectively.

Control circuit 16 also provides a current heading trigger signal 149 to another enable of buffer 76 so that the current heading of the vehicle is provided to control circuit 16 through buffer 76. The current heading is provided to control circuit 16 until there is an indication that the turn is complete. The different ways to determine whether the turn was completed where discussed above in conjunction with FIG. 1, and apply equally to this embodiment as well.

When, the turn is complete, control circuit 16 provides canceling signal 132 to turn signal switch 24. In response, turn signal switch 24 provides a neutral signal 111 to actuator element 22 so that it is changed to its neutral turn position. As a result, actuator element 22 provides a neutral turn indication to turn signal switch 24 which provides the no turn signal 110 to control circuit 16. In response to the neutral turn signal received by control circuit 16, control circuit 16 provides the left and right turn output signals 144 and 146 so that left and right turn lights 62 and 64 are off. In this way, left turn signal 112 or right turn signal 114 are cancelled in response to the heading of the vehicle.

In this embodiment, apparatus 60 includes offset circuitry 70 and Set/Reset circuitry 72. However, it should be noted that offset circuitry 70 and Set/Reset circuitry 72 are optional components, but are included in apparatus 60 for illustrative purposes. Offset circuitry 70 receives an offset trigger signal 152 from control circuit 16 and, in response, provides corresponding offset signals 154 and 156 to pins OFFSET+ and OFFSET–, respectively, of the HMC1001 chip. Set/Reset circuitry 72 receives a restore trigger signal 158 from control circuit 16 and, in response, provides Set/Reset signals 160 and 162 to pins S/R+ and S/R–, respectively, of the HMC1001 chip.

Offset circuitry 70 allows for several modes of operation in response to offset trigger signal 152. For example, offset signals 154 and 156 provided to sensor 19 can be used to subtract out an unwanted magnetic field from heading signal 124 by adjusting the Wheatstone bridge offset. Offset signals 154 and 156 can also be used to set the offset to zero or another desired value. In response to restore trigger signal 158, Set/Reset circuitry 72 can provide Set/Reset signals 160 and 162 to sensor 19 to increase its sensitivity or to flip the polarity of the magnetization vector. Set/Reset signals 160 and 162 can also be cycled during normal operation to improve linearity and reduce cross-axis and temperature effects in sensor 19. More information as to the operation of sensor 19 in response to offset signals 154 and 156 and Set/Reset signals 160 and 162 can be found in the data sheet for the HMC1001 chip which is provided by Honeywell.

Figure 6B:
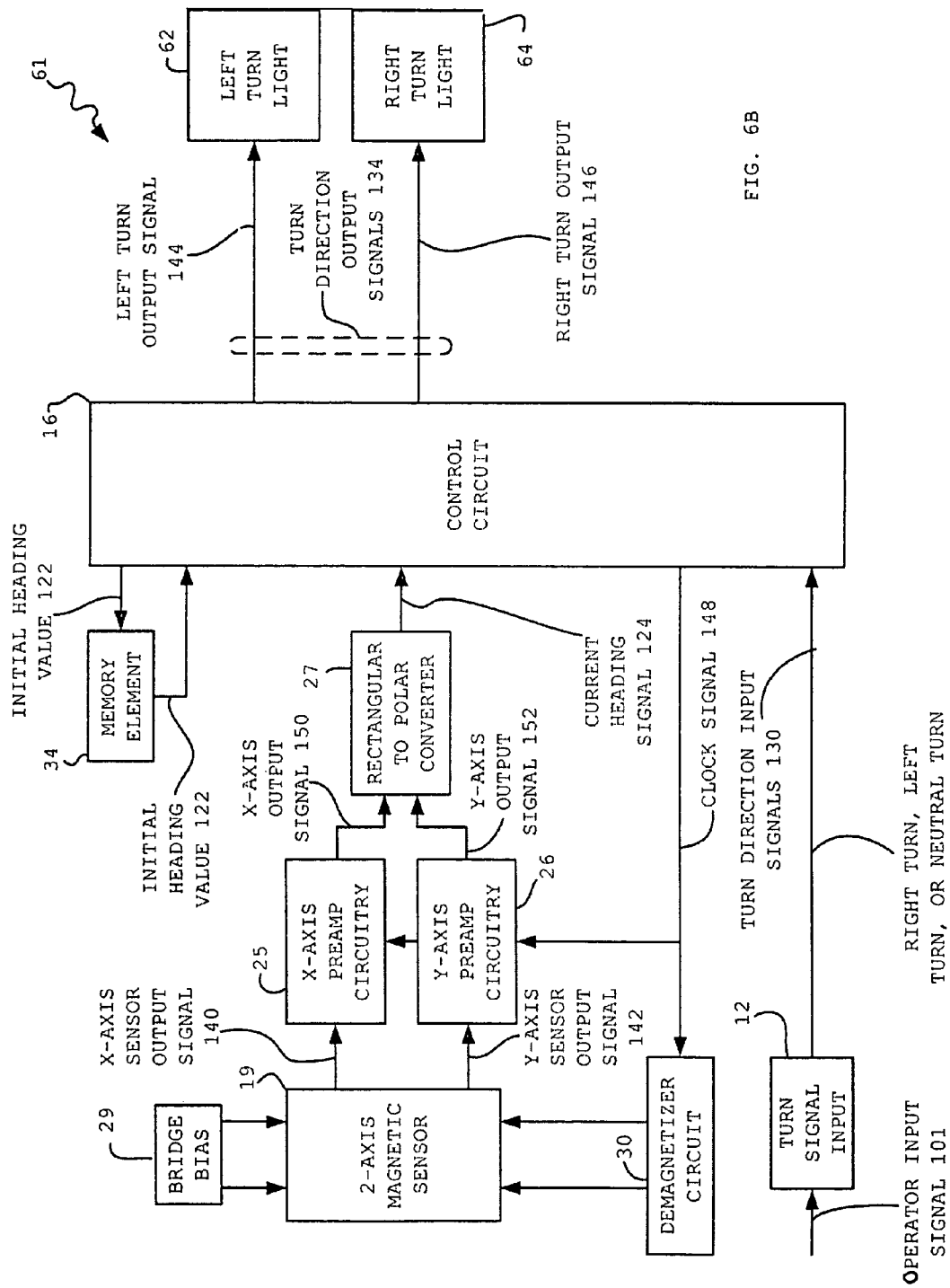

FIG. 6b is a simplified block diagram of another embodiment of a turn signal apparatus 61 in accordance with the present invention, which operates in a similar manner to apparatus 10. In this example, turn direction indicator 12 receives operator input signal 101 and provides turn direction input signals 130 to control circuit 16. Control circuit 16 provides a clock signal 148 to a demagnetizer circuit 30, an X-axis preamplifier circuit 25 and a Y-axis preamplifier circuit 26. Demagnetizer circuit 30 is magnetically coupled to magnetic sensor 19, as will be discussed in more detail below.

In this example, magnetic sensor 19 includes two perpendicular magnetic field sensors, with one being aligned along an X-axis and the other being aligned along a Y-axis, so that they are perpendicular to one another. The X-axis sensor provides an X-axis sensor output signal 140 and the Y-axis sensor provides a Y-axis sensor output signal 142. These signals are proportional to the magnitude and direction of magnetic field B relative to the X- and Y-axes. In this way, sensor 19 resolves the earth's magnetic field into two orthogonal magnetic field components. X-axis output signal 140 is provided to preamplifier circuit 25 and Y-axis output signal 142 is provide to preamplifier circuit 26. Accordingly, X-axis output signal 140 represents the X-component of the magnetic field and Y-axis output signal 142 represents the Y-component. Preamplifiers 25 and 26 condition the respective signals 140 and 142 to a level that is compatible with a rectangular-to-polar converter 27. A bridge bias circuit 29 is coupled to each Wheatstone bridge included in magnetic sensor 19. Bridge bias network 29 provides a stable current through the respective Wheatstone bridge to stabilize sensor output signals 140 and 142.

Rectangular-to-polar converter circuit 27 receives X-axis output signal 150 and Y-axis output signal 152 from circuits 25 and 26, respectively and, in response, outputs current heading signal 124 to control circuit 16. Converter circuit 27 converts output signals 150 and 152 to current heading signal 124 using the equation: Current heading signal=arctan(Y-axis output signal/X-axis output signal). In this equation, the magnitudes of the Y-axis and X-axis output signals are used so that current heading signal 124 represents an angle.

Magnetic sensor 19 can be periodically demagnetized to provide improved and reliable magnetic sensitivity. Accordingly, demagnetization circuit 30 provides a demagnetization magnetic field $B_{Demag}$ to sensor 19. Magnetic field $B_{Demag}$ is generated by providing out of phase electrical signals to a coil positioned proximate to sensor 19. Magnetic field $B_{Demag}$ causes the output of each Wheatstone bridge in sensor 19 to flip polarity. This polarity reversal allows preamplifiers 25 and 26 to ignore systematic errors and amplify only the signal proportional to the earth's magnetic field. Clock signal 148 from the control circuit 16 is used to drive the demagnetizing circuit and to synchronize preamplifiers 25 and 26 so they can remove the periodic polarity switching and reconstruct their respective X- and Y-axis output signals 140 and 142 more accurately.

Memory element 34 receives initial heading value 122 from control circuit 16 and stores and provides it back to control circuit 16. This is done when operator input signal 101 indicates that a left or a right turn has been initiated. Memory element 34 provides control circuit 16 initial heading value 122 to compare against current heading signal 124 while the vehicle is turning. Control circuit 16 determines when to cancel turn direction output signals 134 based on initial heading value 122 and current heading signal 124. Control circuit 16 outputs turn direction output signals 134 which includes left turn output signal 144 and right turn output signal 146. These signals are used to drive respective left and right turn signal lights 62 and 64.

Since this design approach uses current heading signal 124 and initial heading value 122 to determine when to cancel turn direction output signals 134, the absolute magnetic heading is not needed since control circuit 16 operates on the difference between signals 122 and 124. This approach does not need magnetic sensor calibration or error correction because the turn angle measurement does not have to be precise for the design to work satisfactorily. For example, in a typical 90° turn, turn direction output signal 134 should cancel after the vehicle has turned between 50° and 80°. This implies that turn signal apparatus 61 can measure the magnetic heading to within ±15 degrees. Testing has shown that this design can easily meet this accuracy requirement without calibration of magnetic sensor 19.

FIG. 7 is a simplified block diagram of a method 80, in accordance with the present invention, of indicating the turn direction of a vehicle. In one embodiment, method 80 includes a step 82 of receiving a left or right turn direction input signal which indicates the turn direction of the vehicle. A step 83 includes providing a turn direction output signal corresponding to the turn direction input signal. The turn direction output signal can be used to activate and/or deactivate turn direction indicator lamps to indicate the turn direction.

A step 84 includes determining an initial heading value which depends on the heading of the vehicle around the time when the right or left turn direction input signal is received. A step 85 includes determining a current heading value in response to an indication that the vehicle is still turning. In some embodiments, the current heading can be provided in response to a read trigger signal.

A step 86 includes determining whether or not a neutral turn signal should be provided in the turn direction output signal instead of the right or left turn signal. Typically, the neutral turn signal is provided if the vehicle is through turning. In one example, the turn can be through turning if the current heading value is different from the initial heading value by a predetermined amount. If the turn is not through, then control can go to step 85. If the turn is through, then control can go to a step 87. Step 87 includes providing the neutral turn signal in the turn direction output signal if the turn is through so that the turn indication is cancelled. Control is then returned to step 82.

It should be noted that in step 86, the neutral turn signal can be provided before or after the turn is through as discussed in conjunction with FIGS. 2a and 2b. The neutral turn signal can be provided before the turn is through if it is delayed by an appropriate amount of time so that it cancels the turn direction output signal at about the time the vehicle stops turning. The neutral turn signal can be provided after the vehicle is through turning in response to an indication that the vehicle's current heading is approximately constant indicating that the vehicle is heading substantially straight.

FIG. 8 is a simplified block diagram of another method, in accordance with the present invention, of indicating the turn direction of a vehicle. In one embodiment, method 90 includes a start step 91 in which an operator provides an indication of a left turn, a right turn, or a neutral turn. A step 92 includes determining whether a left turn, right turn, or neutral turn indication was provided by the operator. If a neutral turn is provided by the operator, then control returns to step 91. If a left or right turn is provided by the operator, then control moves to a step 93.

In step 93, the corresponding signal light is activated. For example, if a left turn is indicated by the operator in step 90, then the left turn light is activated. Similarly, if a right turn is indicated by the operator in step 90, then the right turn light is activated. A step 94 includes determining an initial heading value which depends on the heading of the vehicle around the time when the right or left turn indication is received from the operator. A step 95 includes determining a current heading value in response to an indication that the vehicle is still turning. In some embodiments, the current heading can be provided in response to a read trigger signal.

A step 96 includes determining whether or not the signal light activated in step 93 should be deactivated. Typically, it is deactivated when the vehicle is through turning as in FIG. 2a. The turn can be through if the current heading value is different from the initial heading value by a predetermined amount. In some embodiments, however, the deactivation can be provided before the turn is through if it has an appropriate time delay, as in FIG. 2b. If the signal light activated in step 93 is to be deactivated before the turn is through, then this can occur when the current heading value is still changing. In other embodiments, the signal light can be deactivated when the current heading is approximately constant and after an appropriate time delay.

In this embodiment, the signal light is deactivated when the vehicle has stopped turning, as in FIG. 2a. Accordingly, if the light should be deactivated, then control can go to a step 97 where it is determined whether or not the current heading value is still changing. If the current heading value is not changing, then this indicates that the turn is through and the vehicle has stopped turning. In this case, control can go to a step 98 where the light activated in step 93 is deactivated. Control can then go back to step 91.

The signal light activated in step 93 can also be deactivated manually by the operator. This can be determined in step 96. If it is decided in step 96 that the light should not be deactivated, then control can go to step 99 where it is decided whether or not the operator manually deactivated the light. If the operator did not manually deactivate the light, then control can go to step 95. If the operator did manually deactivate the light, then control can go to step 98.

It should be noted that the steps in both methods 80 and 90 can occur in many different ways to provide substantially the same or a similar result so that the output signals are activated and deactivated at the desired time in response to the heading of the vehicle. The examples discussed herein are meant to be exemplary and other examples will be readily apparent to those skilled in the art.

Various other changes and modifications will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A turn signal apparatus for signaling a turn from a first heading to a second heading different from the first heading, the turn signal apparatus comprising:
   a magnetic compass which senses a magnetic field and provides heading values in response thereto;
   a turn signal switch;
   a control circuit, coupled to the magnetic compass and the turn signal switch, which, in response to activation of the turn signal switch indicating a turn from a first heading, reads a first heading value from the magnetic compass indicative of the first heading, and provides a turn direction output signal indicating a turn direction from the first heading, and cancels the turn direction output signal in response to the control circuit reading a second heading value from the magnetic compass different from the first heading value indicative of a second heading different from the first heading;
   a turn direction indicator coupled to receive the turn direction output signal; and
   the turn direction indicator includes an actuator element coupled to the turn signal switch, the control circuit providing the turn direction output signal in response to actuation of the actuator element.

2. The apparatus of claim 1 wherein the magnetic compass provides the first heading value in response to actuation of the actuator element.

3. The apparatus of claim 1 wherein the magnetic compass provides a current heading value during actuation of the actuator element.

4. The apparatus of claim 1 further including a turn direction indicator lamp coupled to receive the turn direction output signal and activate in response to receiving the turn direction output signal.

5. The apparatus of claim 1 further including a memory element which stores the first heading value from the magnetic compass.

* * * * *